Feb. 27, 1945.  D. MORROW ET AL  2,370,182

HIGH PRESSURE GAS FITTING

Filed Nov. 13, 1943

Inventors
David Morrow and
Louie Baldo.

By J. J. Fitzgerald
Attorney

Patented Feb. 27, 1945

2,370,182

UNITED STATES PATENT OFFICE 2,370,182

HIGH-PRESSURE GAS FITTING

David Morrow and Louie Baldo,
United States Navy

Application November 13, 1943, Serial No. 510,252

3 Claims. (Cl. 284—17)

(Granted under the act of March 3, 1883, as amended April 30, 1928; 370 O. G. 757)

The present invention relates to high pressure gas fittings and it has a particular relation to fittings adapted to be connected at intervals in a high pressure gas line or manifold for taking off gas at selected points therealong.

The principal object of the invention is the provision of a fitting of the character described which is adapted to be connected in the main high pressure oxygen supply pipe of a high altitude airplane at various battle or operating stations whereby a crew member equipped with an oxygen mask can move from station to station, quickly disconnecting his mask from the main supply line at one station and connecting it thereto at another station.

Another object of this invention is the provision of a fitting of the type indicated embodying a valve mechanism by means of which the gas pressure on opposite sides of the valve is first equalized so as to permit of a subsequent easy opening of the valve and which will quickly restore itself to its initially closed position as soon as the crew member disconnects his gas mask therefrom.

With such objects in view, as well as other advantages which may be incident to the use of the improvements, the invention consists of the parts and combinations thereof hereinafter set forth and claimed with the understanding that the several necessary elements constituting the same may be varied in proportions and arrangement without departing from the nature and scope of the invention as defined in the appended claims.

In order to make the invention more clearly understood there are shown in the accompanying drawing, means for carrying the invention into practical effect, without limiting the improvements in their useful application to the particular constructions which for the purpose of explanation has been made the subject of illustration.

Figures 1, 2:
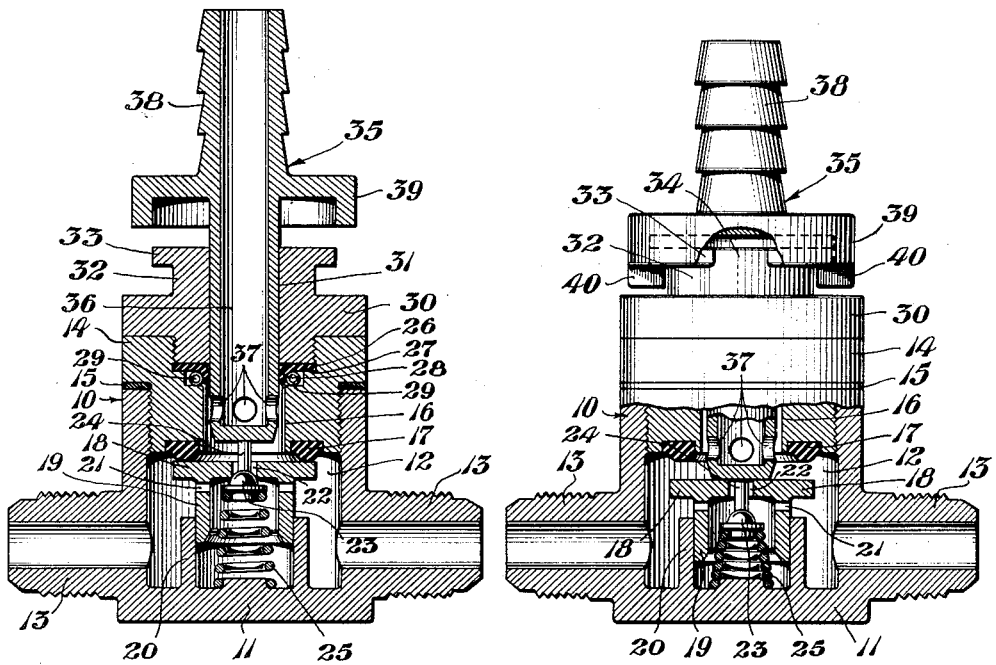
Fig. 1 is a vertical sectional view through a fitting constructed in accordance with the invention illustrating the valve parts in closed positions.
Fig. 2 is a view partly in side elevation and partly in vertical section and showing the valve parts in open positions.
Figure 3:
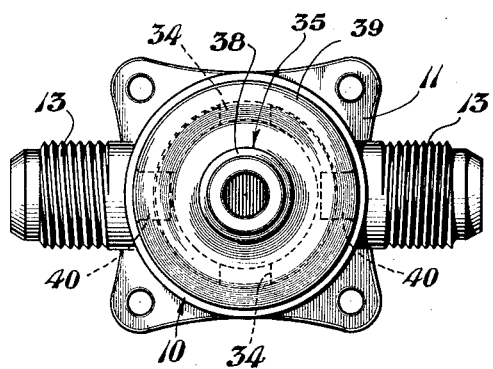
Fig. 3 is a plan view of the improved fitting.

Referring to the drawing, a high pressure gas fitting embodying the present invention is shown as comprising a body portion 10 having a flanged base 11 adapted to be secured to a supporting structure of the aircraft and formed with a high pressure gas chamber 12 communicating with screw threaded nipples 13 which are adapted to be connected with the main high pressure gas line or manifold of the aircraft, not shown.

A plug 14 is threaded into the upper end of the body 10 and into tight sealing engagement with a sealing gasket 15 and is formed with an axial bore or low pressure outlet chamber 16. The plug 14 is provided with a valve seat 17 surrounding the lower end of the bore 16 and is formed of rubber or rubber like material having the proper low temperature characteristics and is adapted to be engaged by a main valve member 18. The valve member 18 is formed with a depending tubular skirt 19 which telescopes within a cylindrical guide member 20 formed on the base of the body 10 within the high pressure chamber 12 and is provided with a plurality of ports 21 communicating with the high pressure chamber 12. The valve member 18 is also formed with a central opening 22 which is at times closed by a small pilot valve member 23 having a valve stem 24 which extends upwardly into the bore 16 and is urged toward its closed position by a coil spring 25.

The upper portion of the plug 14 is formed with a seat or socket 26 for receiving a sealing member 27 having a depending annular lip or flange 28 which is also fabricated from rubber or rubber like material having the proper low temperature characteristics. The lip 28 is urged inwardly by a circular coil spring 29 and the assembly is securely held in position by a plug 30 which is threaded into the socket and which is formed with an axial bore 31 in alignment with the bore 16. The upper or outer face of the plug 30 is formed with a cylindrical extension 32 having an over-hanging flange 33 provided with two diametrically disposed notches 34 (Fig. 2).

Cooperating with the above described valve mechanism is a connector element 35 having a tubular portion 36 formed with openings 37 adjacent to its lower end and with an oppositely extending nipple 38 adapted to be connected with the flexible hose or tube leading to the gas mask of the operator. The connector element 35 is also formed with a cup shaped flange 39 adapted to embrace the flange 33 on the plug 30 and with two diametrically disposed inwardly extending lugs 40 (Fig. 2) adapted to enter the notches 34 and to engage beneath the flange 33 when the connector is inserted in the fitting, pressed down and given a partial turn, thus to lock the connector element to the fitting in the manner of a bayonet joint when the device is in use.

When the fitting is not being used to supply oxygen to an oxygen mask, the coil spring 25 urges the pilot valve 23 and the main high pressure valve 18 toward a seating position wherein the pressure of the gas in the high pressure chamber 12 will thereafter hold these valves tightly closed. However, should a crewman desire to use a fitting at some particular station he will insert the connector element 35 on the hose of his individual oxygen mask in the bore 31 in the plug 30 and press it inwardly until its lower end wall, constituting a terminal abutment on said tubular connector contacts with the valve stem 24 of the pilot valve 23, thus depressing the same against the action of the coil spring 25. This will permit high pressure oxygen gas to flow from the high pressure chamber 12, through the ports 21 in the skirt 19 and thence through the opening 22 into the bore 16 above the valve 18, thus equalizing the pressure above and below this valve and rendering it an easy matter for it to be opened to its full extent by a further downward pressure of the connecting element 35. The high pressure gas thus admitted into the bore 16 forces the lip 28 of the sealing member 27 into leakproof contact with the tubular portion 36 of the connector element 35. When this is accomplished the connecting element 35 is given a turn of 90° thus securely locking this element to the fitting until its removal is desired. If the crewman thinks that he is receiving an excess supply of oxygen or has received sufficient for the time being he can reverse the above described operation so as to discontinue the supply of oxygen to his mask temporarily without leaving his station.

It will be obvious that the invention is capable of use for other purposes as, for example in a factory or shop main high pressure air line or line supplying gas for welding purposes.

It will be understood, as previously stated, that the above description and accompanying drawing comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

We claim:

1. A fitting adapted to be connected in a high pressure fluid supply line comprising a body member having a high pressure chamber therein for communication with a source of high pressure fluid, and having a low pressure outlet chamber communicable with said high pressure chamber; a main valve for controlling communication between said high pressure chamber and said outlet chamber, a pilot valve in said main valve; spring means for urging said valves toward a closed position; and a tubular connector element adapted to be connected to the inlet hose of a device utilizing said fluid and insertable in said low pressure outlet chamber, said tubular connector having a wall closing the end thereof for engaging said pilot valve when so inserted for first engaging and opening said pilot valve to equalize the pressure on opposite sides of said main valve and for subsequently engaging and opening said main valve against the action of said spring means, said tubular connector element having an opening therein adjacent to said closed end wall thereof thus to admit high pressure fluid to said tubular connector element for delivery to said utilizing device; and a sealing gasket carried by said body member and having a depending annular lip adapted to be forced into sealing engagement with said connector element by the pressure of the gas in said outlet chamber.

2. A fitting adapted to be connected in a high pressure fluid supply line comprising a body member having a high pressure chamber therein for communication with a source of high pressure fluid, and having a low pressure outlet chamber communicable with said high pressure chamber; a main valve for controlling communication between said high pressure chamber and said outlet chamber, a pilot valve in said main valve; spring means for urging said valves toward a closed position; and a tubular connector element adapted to be connected to the inlet hose of a device utilizing said fluid and insertable in said low pressure outlet chamber, said tubular connector having a wall closing the end thereof for engaging said pilot valve when so inserted for first engaging and opening said pilot valve to equalize the pressure on opposite sides of said main valve and for subsequently engaging and opening said main valve against the action of said spring means, said tubular connector element having an opening therein adjacent to said closed end wall thereof thus to admit high pressure fluid to said tubular connector element for delivery to said utilizing device; and a sealing gasket carried by said body member and having a depending annular lip adapted to be forced into sealing engagement with said connector element by the pressure of the gas in said outlet chamber; and a circular coil spring surrounding said tubular connector element and said depending annular lip of the sealing gasket to also urge the lip into firm sealing engagement with the connector element.

3. A fitting adapted to be connected in a high pressure fluid supply line comprising a body member having a high pressure chamber therein for communication with a source of high pressure fluid, and having a low pressure outlet chamber communicable with said high pressure chamber, a main valve for controlling communication between said high pressure chamber and said outlet chamber, a pilot valve in said main valve and having a stem, spring means for urging said valves toward a closed position, and a tubular connector element adapted to be connected to the inlet hose of a device utilizing said fluid and insertable in said low pressure outlet chamber, said tubular connector having an end wall constituting a terminal abutment at the end of the tube in alignment with the said pilot valve stem for engaging the pilot valve stem and opening said pilot valve to equalize the pressure on opposite sides of said main valve, the terminal abutment of said tubular connector extending laterally beyond the pilot valve stem and providing a surface for engaging and opening said main valve against the action of said spring means, said tubular connector element having an opening in its tubular wall adjacent to said terminal abutment thus to admit high pressure fluid to said tubular connector element for delivery to said utilizing device.

DAVID MORROW.
LOUIE BALDO.